(12) United States Patent
Jaskiewicz (10) Patent No.: US 11,646,538 B2
(45) Date of Patent: May 9, 2023

(54) POWER SUPPLY CONNECTOR WITH MULTIPLE CONNECTIONS FOR RELATIVELY MOVING PARTS OF A WORKING MACHINE, A USE OF A POWER SUPPLY CONNECTOR WITH MULTIPLE CONNECTIONS

(71) Applicant: Volvo Construction Equipment AB, Eskilstuna (SE)

(72) Inventor: Krzysztof Jakub Jaskiewicz, Wroclaw (PL)

(73) Assignee: Volvo Construction Equipment AB, Eskilstuna (SE)

( * ) Notice: Subject to any disclaimer, the term of this patent is extended or adjusted under 35 U.S.C. 154(b) by 81 days.

(21) Appl. No.: 17/282,251

(22) PCT Filed: Oct. 5, 2018

(86) PCT No.: PCT/EP2018/077108
§ 371 (c)(1),
(2) Date: Apr. 1, 2021

(87) PCT Pub. No.: WO2020/069751
PCT Pub. Date: Apr. 9, 2020

(65) Prior Publication Data
US 2021/0351552 A1    Nov. 11, 2021

(51) Int. Cl.
*H01R 39/00* (2006.01)
*H01R 35/04* (2006.01)
(Continued)

(52) U.S. Cl.
CPC .......... *H01R 35/04* (2013.01); *B60R 16/03* (2013.01); *E02F 9/0858* (2013.01); *H01R 2201/26* (2013.01)

(58) Field of Classification Search
CPC .... H01R 35/04; H01R 2201/26; B60R 16/03; E02F 9/0858
(Continued)

(56) References Cited

U.S. PATENT DOCUMENTS 2,820,207 A * 1/1958 Roy .................... H01H 19/58
  310/232
3,517,369 A * 6/1970 Buschbom ............ H01R 39/64
  439/21
(Continued)

FOREIGN PATENT DOCUMENTS

CN  1484480 A  3/2004
CN  1638406 A  7/2005
(Continued)

OTHER PUBLICATIONS

Chinese First Office Action dated Mar. 3, 2022 for Chinese Patent Application No. 201880098398.3, 11 pages (including English summary).
(Continued)

*Primary Examiner* — Abdullah A Riyami
*Assistant Examiner* — Vladimir Imas
(74) *Attorney, Agent, or Firm* — Sage Patent Group (57) ABSTRACT

A power supply connector has a first part and a second part that are connected to each other such that they can turn relative each other within a predefined and/or restricted turning angle. The first part includes a first set of plurality of conductors and the second part includes a corresponding second set of plurality of conductors, wherein the pairs of conductors are electrically connected by electrical connections including a connection tip on one of the first and the second part and a contact surface on the other one, wherein the electrical connections are provided in at least one circular shape around a turn axis of the power supply
(Continued)

connector The turning angle between the first part and the second part is limited to the shortest angular extension of the contact surfaces and the contact surfaces are distributed such that the pair of conductors are permanently electrically connected.

17 Claims, 6 Drawing Sheets

(51) Int. Cl.
  *B60R 16/03* (2006.01)
  *E02F 9/08* (2006.01)
(58) Field of Classification Search
  USPC .............................................................. 439/11
  See application file for complete search history.

(56) References Cited

U.S. PATENT DOCUMENTS

| | | | | |
|---|---|---|---|---|
| 3,613,044 | A | * | 10/1971 | Rarick .................... H01R 13/72 174/67 |
| 4,098,526 | A | * | 7/1978 | DuBois ................. H01R 39/00 285/119 |
| 4,209,214 | A | * | 6/1980 | Martinez ................ H01R 39/00 439/22 |
| 4,294,500 | A | * | 10/1981 | Wilson ................... H01R 39/00 439/26 |
| 4,525,610 | A | * | 6/1985 | Le Magourou .......... H01H 5/16 200/51.09 |
| 4,850,881 | A | * | 7/1989 | Lagier ................. B60R 16/027 439/15 |
| 5,897,382 | A | | 4/1999 | Takahaski |
| 7,037,126 | B2 | * | 5/2006 | Tsutsumi ............. H01R 39/643 285/119 |
| 7,094,084 | B2 | | 8/2006 | Lee |
| 7,097,479 | B2 | | 8/2006 | Lee |
| 7,229,289 | B2 | | 6/2007 | Bang |
| 7,601,007 | B1 | * | 10/2009 | Pogue ..................... B60D 1/62 439/35 |
| 7,635,266 | B1 | | 12/2009 | Brown et al. |
| 9,070,496 | B2 | | 6/2015 | Arakawa |
| 9,276,361 | B2 | * | 3/2016 | Peng ...................... H01R 13/70 |
| 9,468,363 | B2 | * | 10/2016 | Feingold ............. A61B 1/00124 |
| 9,515,443 | B2 | * | 12/2016 | Murris ................... H01R 39/64 |
| 10,397,678 | B2 | * | 8/2019 | Rodrigues ............... H04R 3/12 |
| 10,574,012 | B2 | * | 2/2020 | Matsuo ..................... C22C 9/06 |
| 11,050,187 | B2 | * | 6/2021 | Troufflard ........... H01R 13/631 |
| 11,101,584 | B2 | * | 8/2021 | Tan ..................... H01R 12/7076 |
| 2019/0106006 | A1 | * | 4/2019 | Ng ...................... H01R 13/6205 |
| 2021/0086634 | A1 | * | 3/2021 | Kupfer .................... B60L 53/16 |

FOREIGN PATENT DOCUMENTS

| | | |
|---|---|---|
| CN | 1722546 A | 1/2006 |
| CN | 103222129 A | 7/2013 |
| EP | 0695662 A1 | 2/1996 |
| FR | 2626233 A1 | 7/1989 |
| GB | 2369503 A | 5/2002 |
| JP | S5176102 U | 6/1976 |
| JP | H07254461 A | 10/1995 |
| JP | 2001076834 A | 3/2001 |
| JP | 2002152960 A | 5/2002 |
| JP | 3122666 U | 6/2006 |
| JP | 2008066235 A | 3/2008 |
| KR | 20160109123 A | 9/2016 |

OTHER PUBLICATIONS

International Search Report and Written Opinion of the International Searching Authority, PCT/EP2018/077108, dated Jul. 4, 2019, 15 pages.

Chinese Notice of Grant dated Jul. 19, 2022 for Chinese Patent Application No. 201880098398.3, 6 pages (including English translation).

* cited by examiner

POWER SUPPLY CONNECTOR WITH MULTIPLE CONNECTIONS FOR RELATIVELY MOVING PARTS OF A WORKING MACHINE, A USE OF A POWER SUPPLY CONNECTOR WITH MULTIPLE CONNECTIONS

CROSS REFERENCE TO RELATED APPLICATIONS

This application is a 35 U.S.C. § 371 national stage application of PCT International Application No. PCT/EP2018/077108 filed on Oct. 5, 2018, the disclosure and content of which is incorporated by reference herein in its entirety.

FIELD OF INVENTION

The invention relates to a turnable power supply connector with multiple connections. The invention further relates to a working machine having a first part and a second part that are connected in a turnable connection, wherein electric power supply from power cables wiring on the first part to power cables on the second part comprises a turnable power supply connector.

The invention is applicable on working machines within the fields of industrial construction machines or construction equipment. Although the turnable power supply connector will be described with respect to an wheel-loader, the turnable power supply connector is not restricted to this particular machine, but may be used in other machines having two connected and relative each other turnable parts, such as heavy and medium duty trucks, heavy and medium busses, industrial robots, etc.

BACKGROUND OF INVENTION

When there is a need to supply electrical power from a stationary structure of a machine to a rotatable structure thereof, the traditional way is to use thick cables that can be bent and follow the relative movement. A typical application is between the rear part and the front part of a wheel loader, which is limited turnable around an axis or between a swing-arm and a front part of the machine.

Thick power supply cables are needed between the two parts of e.g. the wheel loader, for e.g. the power supply of electrical machines arranged in the front part, but which is supplied with power from the rear part. The thick cables that are required in those contexts are in many cases hard to bend which limits the possibilities for the design or has a negative influence in this respect. Such cables are also bulky and exposed to wear. It is therefore a desire for a more appropriate arrangement for supplying electric power between two turnable parts.

In electrical engines, electricity is supplied from the winding in the stator to the winding in the rotor by means of a connector with a sliding ring. Representative examples of such connectors are disclosed e.g. in GB 2369503 and EP 0695662.

GB 2369503 discloses a vehicle wheel hub motor with power supply wires extending through a shaft that is fixed to the vehicle at both ends. Carbon brushes, fixed to the shaft, are in electrical contact with a connector and are in contact with the supply wires. The connector is fixed to a rotatable part and supplies power to the windings on the rotatable part. As usual, the connector includes annular sliding plates being complete rings. EP 695662 describes a similar connector. A problem with these connectors are that they do not provide a compact solution for a multiple power supply connection between two rotatable parts.

In U.S. Pat. No. 7,635,266 is an alternative connector described. The rotary contact device in U.S. Pat. No. 7,635,266 includes a stationary member configured to be coupled to a base, and a rotatable member supported for rotation relative to the stationary member and defining a centre opening. A raceway includes a plurality of axially spaced annular contact rings supported by one of the stationary member and the rotatable member. A blade tower includes a plurality of axially spaced blade assemblies and is supported by the other member. Each blade assembly includes a radially extending contact blade in electrical communication with one of the axial spaced contact rings of the raceway.

U.S. Pat. No. 7,635,266 presents a multiple power connection, which however is bulky and not suitable to provide in applications with a higher packing requirement, e.g. between a rear part and a front part of a wheel loader.

SUMMARY OF INVENTION

The object of the present invention is to alleviate the drawbacks related to traditional arrangements of the electric power supply from a stationary part to a rotatable part of machines as described above, and thus to achieve a more appropriate power supply.

The invention relays on the finding that in many applications a 360° turning angle is not necessary between a stationary and a rotatable part of a machine. This can be used to share the space available on one circular connection to connect several conductors at the same circumference, and thereby decrease the package space of a turnable multiple power supply connector.

According to the first aspect of the present invention this is achieved by a power supply connector having a first part and a second part that are connected to each other such that they can turn relative each other about a common turning axis within a predefined and/or restricted turning angle and the first part comprises a first set of plurality of conductors and the second part comprises a corresponding second set of plurality of conductors, such that pairs of conductors are formed, wherein the pairs of conductors are electrically connected by electrical connections comprising a connection tip on one of the first and the second part and a contact surface on the other one of the first and second part, wherein the electrical connections are provided in at least one circular shape around a turn axis of the power supply connector, the invention is characterized in that the circumferential extension of the respective contact surface is less than 360° divided with the number of pairs of conductors and multiplied with the number of circular shapes the contact surfaces are distributed over, and that the predefined and/or restricted turning angle between the first part and the second part is limited to the shortest angular extension of the contact surfaces, and that the contact surfaces are distributed such along the at least one circular shape that the pair of conductors are permanently electrically connected.

By limiting the turning angle between the two parts in combination with providing several electrical connections in the same circular space, more connections can be provided within a smaller space that in known solutions and still keeping a constant electrical contact between the pair of conductors of the two parts. The turning angle for the intended applications is limited to be below 360° or even below 180° dependent on the number of pairs of conductors and the number of circular shapes they are distributed over.

The number of circular shapes is equal or less than the number of pair of conductors. In one exemplary embodiment corresponding to turning angles below 180° the number of circular shapes are maximum half of the number of pair of conductors.

The turning angle of the connector is predefined and/or restricted to the shortest angular extension of the contact surfaces. An effect of this restriction in turning angle is that the pairs of conductors will be in permanently electrical connection.

The number of circular shapes the electrical connections should be distributed over depends on the turnability requirement of the intended application. With a circular shape is meant that the electrical connections moves along the circle of the circular shape when the connector is turned about its turning axis.

Additionally a smaller allowed angular distance between two in circumferential direction adjacent contact surfaces can be compensated with a larger diameter of the circle in order to achieve a sufficient distance between two adjacent contact surfaces. The power supply connector according to the above is flexible in choosing a larger axial or radial building space depending on how the different parameters are chosen, i.e. number of circular shapes, their radius/diameter and number of electrical connections in relation to the required turning angle between the first and the second part.

The power supply connector according to the above that can replace the circumstantial moving cables between the stationary and rotatable structures with limited turnability of a machine. The possibility to replace the connection cables with the invented connector offers a simpler and better adapted electrical communication to the rotatable part. The connection is space saving and has a better durability than the traditional connection. It also results in long lifetime and simplified service. Preferably, the connection tip is urged by a spring against the contact surface. Suitable material for the brush is carbon or cupper. The connection brush may be sliding or may be a roller. The spring means can be any suitable spring means such as a coil spring, blade spring or material with inherent elasticity.

Each contact surface should be arranged with a distance to any another contact surface such to ensure that there is no electrical contact between any of the electrical contacts. The distance needed is dependent on the electrical insulation properties of an insulation material arranged there between. The distance is further dependent on the level of voltage the electrical connection is provided for. It is foreseen that there can be different distances between different electrical connections dependent on level of the voltage the individual electrical connection is provided for.

In one exemplary embodiment the connector constitutes a commutator.

In one exemplary embodiment of the power supply connector, each set of conductors is provided with at least two conductors with a corresponding pair of electrical connections distributed over one circular shape. Hence, the two pair of conductors with respective electrical connections are distributed over one circular shape about the turn axis of the connector. In such a configuration, a turn angle of the connector would be less than 180°. How much less is dependent on the required distance between the electrical connections, i.e. the contact surfaces and the connection tips. This embodiment allows for a compact configuration of a connector with two pair of conductors, where the connector needs a turnability less than 180°. For example a low voltage electrical engine requiring only a one phase current could be connected with such a connector.

In one exemplary embodiment of the power supply connector, each set of conductors is provided with at least three conductors with corresponding pairs of electrical connections distributed over one circular shape. Hence, the three pair of conductors with respective electrical connections are distributed over one circular shape about the turn axis of the connector. In such a configuration, a turn angle of the connector would be less than 120°. How much less is dependent on the required distance between the electrical connections, i.e. the contact surfaces and the connection tips. This embodiment allows for a compact configuration of a connector with three pair of conductors, where the connector needs a turnability less than 120°. For example a high voltage electrical engine requiring a high voltage and is working in multiple circuits.

In other exemplary embodiment of the power supply connector, each set of conductors is provided with at least six conductors with corresponding pairs of electrical connections distributed over one or two circular shapes. Hence, the six pair of conductors with respective electrical connections are distributed over one or two circular shapes about the turn axis of the connector. In a configuration with one circular shape a turn angle of the connector would be less than 60°. How much less is dependent on the required distance between the electrical connections, i.e. the contact surfaces and the connection tips. In a configuration with two circular shapes a turn angle of the connector would be less than 120°. How much less is dependent on the required distance between the electrical connections, i.e. the contact surfaces and the connection tips. These exemplary embodiments allows for a compact configuration of a connector with six pair of conductors, where the connector needs a turnability less than 60° or 120°. For example two high voltage electrical engines with separate steering requires two independent high voltage three phase circuits and could be connected with such a connector.

In other exemplary embodiment of the power supply connector, each set of conductors is provided with at least twelve conductors with corresponding pairs of electrical connections distributed over one or two circular shapes. Hence, the twelve pair of conductors with respective electrical connections are distributed over one or two circular shapes about the turn axis of the connector. In a configuration with one circular shape a turn angle of the connector would be less than 30°. How much less is dependent on the required distance between the electrical connections, i.e. the contact surfaces and the connection tips. In a configuration with two circular shapes a turn angle of the connector would be less than 60°. How much less is dependent on the required distance between the electrical connections, i.e. the contact surfaces and the connection tips. These exemplary embodiments allows for a compact configuration of a connector with twelve pair of conductors, where the connector needs a turnability less than 30° or 60°. For example four high voltage electrical engines with separate steering requires a four independent high voltage three phase circuit and could be connected with such a connector.

In the above examples with the circular shapes, the shapes can be provided at different axial heights in relation to the turn axis and/or provided with different diameters. Which one is preferable is dependent on the application for the connector and the applications requirements in building space, i.e. if the connector must be as slim as possible in axial direction or in radial direction.

As can be understood by the examples above, the number of pair of conductors and the number of circular shapes can be varied within the limitations of this invention. Embodiments with the electrical connections distributed between more than two circular shapes is obvious possible according to the same general principal of the invention.

According to an exemplary embodiment, all connection brushes are arranged on one and the same of the first and second parts. Correspondently, all contact surfaces are arranged on the other one of the first and second parts. An exemplary effect of this is that it facilitates to obtain a simple and uniform design and is convenient at service. The risk for faults will be less in comparison with a mixed arrangement.

According to a further exemplary embodiment, one part comprises a shaft, and the other part is rotatable around the axis of the shaft. Arranging the relative turnability between the parts in this way assures a correct alignment and a robust construction.

According to a further exemplary embodiment, the contact surfaces are arranged along at least one circular shape around the turn axis of the connector, with a circumferential distance between each two connection plates arranged in the same circle. The circular arrangement of the connection plates implies a corresponding circular arrangement of the connection tips. This geometry further contributes to a simple and reliable construction. The distances between the plates prevents that any part of an electrical connection comes into electrical contact with another electrical connection. Preferably, the connection plates are equally angularly distributed.

According to a further exemplary embodiment, some of the contact surfaces are arranged along a first circular shape around the turn axis of the connector and other contact surfaces plates are arranged along a second circular shape around the turn axis of the connector. The second circular shape has another diameter and/or another axial position than the first circular shape in relation to the turn axis of the connector. By arranging the connection plates in this way, distributed about two circles, more space is provided for each contact surface, which is an advantage when the number of pairs of conductors that are to be connected is high. Preferably half of the number of connection plates are arranged in each of the two circles. Arranging the connection plates along more than two circles may also be contemplated.

The contact surfaces can be provided on individual connection plates. However in one exemplary embodiment a plurality of contact surfaces share a common connection plate and in another exemplary embodiment one common contact plates is provided for at least all the electrical connections in the same circular shape. The connection plates with their contact surfaces can be provided in similar manner as a printed circuit board.

According to a further exemplary embodiment, the circumferential extension of the contact surfaces in a circle is 0.5-5 times as large as the sum of the circumferential extensions of the distances between them. It is on one hand important to have a sufficient distance between the contact surfaces in order to avoid electrical leak. On the other hand each contact surface needs a certain minimum angular extension for allowing a sufficient turn angle of the connector. The specified range is normally an appropriate balance between these two considerations. In another exemplary embodiment, connection plates in a circle is about 1-3 times as large as the sum of the circumferential extensions between them.

According to another exemplary embodiment, the angular distance between two neighbouring contact surfaces along the same circular shape is in the range 5-60°. The specified range for the distances represents a corresponding balancing as for the embodiment above, and thus allows a sufficient angular extension of each connection plate without risk for leak. In one exemplary embodiment, the distance is within the range of 5-30°.

According to a further exemplary embodiment, the contact surface of at least one connection plate is radially directed and is curved or arc-shaped in the circumferential direction. This implies that the corresponding sliding connection brush is radially directed as well, and that the electrical connection thus is radial. An exemplary effect the radial arrangement is that it provides a more compact axial design. In one exemplary embodiment all the contact surfaces of the connection plates are radially directed. In one exemplary embodiment the contact surfaces are arranged to face radially outwards.

According to another exemplary embodiment, the contact surface of at least one connection plate is axially directed and is planar in the circumferential direction. An exemplary effect of an axial connection direction is that it allows a more compact radial design. In one exemplary embodiment all the contact surfaces of the connections plates are axially directed. It is suggested that the contact surface of the connection plate is planar in the radial direction. Preferably it is located in a plane that is completely radial, although an oblique arrangement not is excluded.

In one exemplary embodiment a combination of radial, axial and oblique arrangement of the contact surfaces is provided in order to make a connector with a large quantity of electrical connections as axial and radial compact as possible.

According to one embodiment, the turnability of the connector is within a range of 12° to less than 180°, dependent on application.

The connector is provided to be implemented in applications with a relative low turning speed of the rotatable parts, such as less than 5 radians/sec. In contrast to many conventional connectors in electrical machines, the power supply of the present invention is intended to be used with relatively slowly relatively turning structures, with limited turning angle.

One aspect of the invention relates to a machine, in particular a construction machine or an industrial machine, having a first structure and a second structure, being turnable relative each other about a turn axis and being provided with a power supply connector according to any embodiment or combination of embodiments as presented above. The first part of the first structure fixed to the first part of the power supply connector and the second structure fixed to the second part of the power supply connector. An exemplary effect of providing a power supply connector according to the above in a machine is that a plurality of electrical driven sources upon the first structure can be supplied with electrical power provided from the second structure without the need for sturdy and bulky cables at the turning point between the first and second structure.

One aspect of the invention relates to a vehicle, in particular a construction vehicle, having a first structure and a second structure, being turnable relative each other about a turn axis and being provided with a power supply connector according to any embodiment or combination of embodiments as presented above. The first part of the first structure fixed to the first part of the power supply connector and the second structure fixed to the second part of the power supply connector. An exemplary effect of providing a power supply connector according to the above in a machine is that a plurality of electrical driven sources upon the first structure can be supplied with electrical power provided from the second structure without the need for sturdy and bulky cables at the turning point between the first and second structure.

Another aspect of the invention relates to a first part for a power supply connector, wherein the part being adapted to be turnable connected to a second part, wherein the first part being turnable in a predefined and/or restricted turning angle relative the second part about a turn axis, wherein the first part has a set of conductors, each conductor being provided with a contact surface, wherein the contacts surfaces being provided in at least one circular shape about the turn axis of the power supply connector. The circumferential extension of the respective contact surface is less than 360° divided with the number of conductors and multiplied with the number of circular shapes the contact surfaces are distributed over, and the predefined and/or restricted turning angle between the first part and the second part is limited to the shortest angular extension of the contact surfaces.

By limiting the turning angle the first parts is arranged for in combination with and dependent on providing several electrical connections in the same circular space, more connections can be provided within a smaller space that in known solutions and still keeping a constant electrical contact between the pair of conductors of the two parts. The turning angle for the intended applications is limited to be below 360° or even below 180° dependent on the number of pairs of conductors and the number of circular shapes they are distributed over. The number of circular shapes is equal or less than the number of pair of conductors. In one exemplary embodiment corresponding to turning angles below 180° the number of circular shapes are maximum half of the number of pair of conductors.

The number of circular shapes the electrical connections should be distributed over depends on the turnability requirement of the intended application.

One aspect of the invention relates to a use of the power supply connector according to the any of the disclosed embodiments or relevant combination thereof, for providing electric power from a first set of conductors, on a first structure of a machine or a vehicle to a second set of conductors of a second structure of the machine or the vehicle.

It is to be understood that further exemplary embodiments may be constituted by any possible combination of features in the exemplary embodiments and by any possible combination of these features with features described in the description of examples below.

DESCRIPTION OF EXAMPLES

The present invention will be described more fully hereinafter with reference to the accompanying drawings, in which exemplary embodiments of the invention is shown. The invention may, however, be embodied in many different forms and should not be construed as limited to the embodiments set forth herein, rather, the embodiments are provided for thoroughness and completeness. Like reference character refer to like elements throughout the description.

Figure 1:
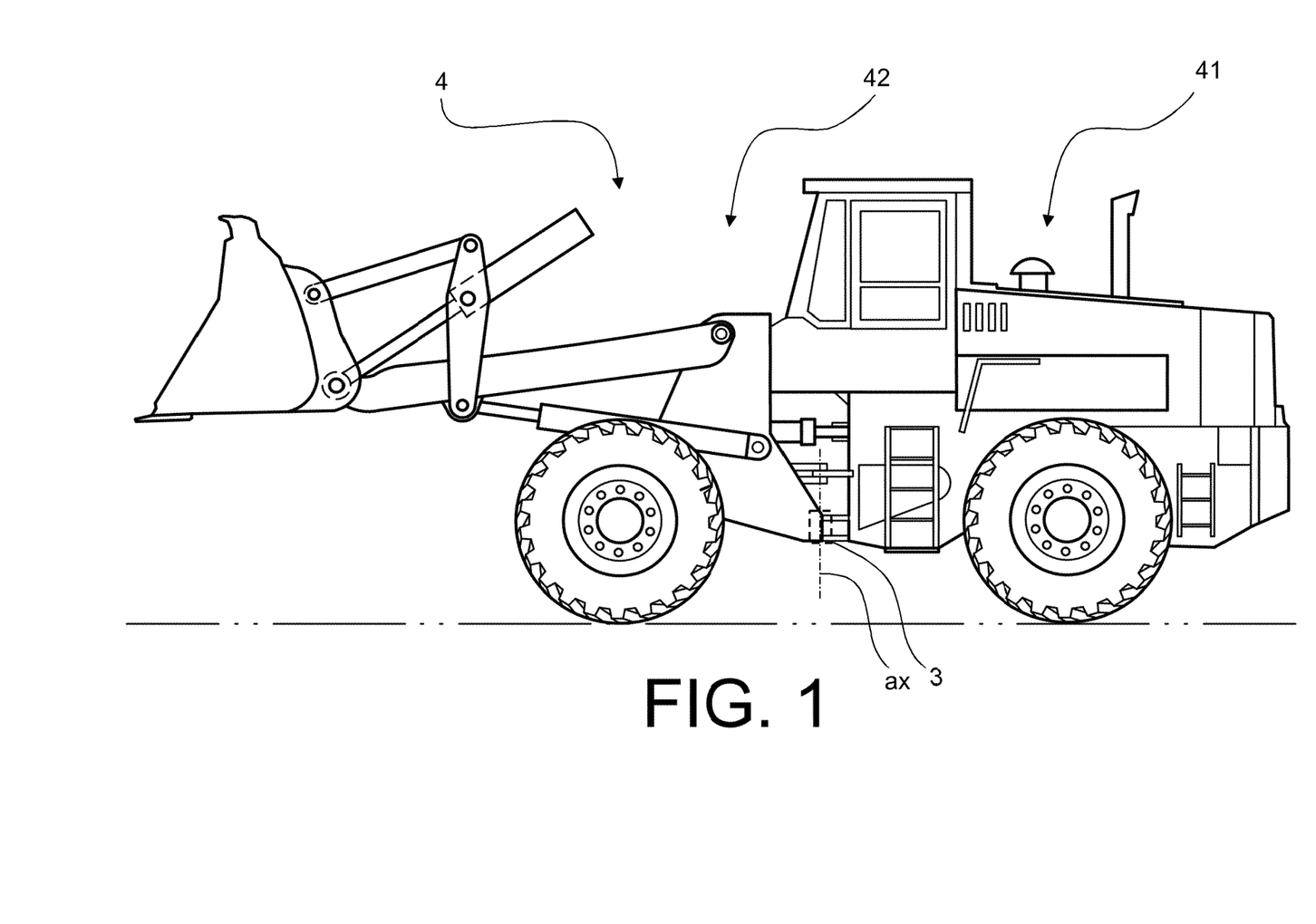
FIG. 1 is a schematic side view of a construction vehicle according to the invention.

With particular reference to FIG. 1, there is provided a working machine 4 according to the present invention. The working machine depicted in FIG. 1 is a wheel loader for which the inventive connector 3 will be described in detail below, is particularly suitable for. Alternative implementations of the connector 3 are in trucks, backhoe loaders, industrial machines, and any machine with two relative to each other turnable parts, such as an industrial robot or the like.

FIG. 1 shows a construction vehicle 4 with a stationary rear structure 41 and a turnable front structure 42, which is limited rotatable about a vertical turn axis ax between the rear structure 41 and the front structure 42. The rotatable front structure 42 has electrically driven equipment, for example an electrical motor/generator for each wheel and the power for the electrical motor/generator is supplied from the rear structure 41. Additionally is the electrical power generated by an electrical motor/generator stored in a battery in the rear structure 42, which requires separate wiring, i.e. conductors. Thus, conductors extend from the power source in the rear structure 41 to the electrical motor/generator locations in the top structure 2. The conductors are connected through a power supply connector 3 in a section connecting the rear structure 41 to the front structure 2. The power supply connector 3 has a first part connected to the rear structure 41 and a second part connected to the front structure 42. The power supply connector 3 is according to the present invention as described more in detail below. In the illustrated example the wheel loader requires a that the power supply connector has an angular turnability of 30°. The actual turnability depends on the required distance between the individual electrical connections.

Figure 2:
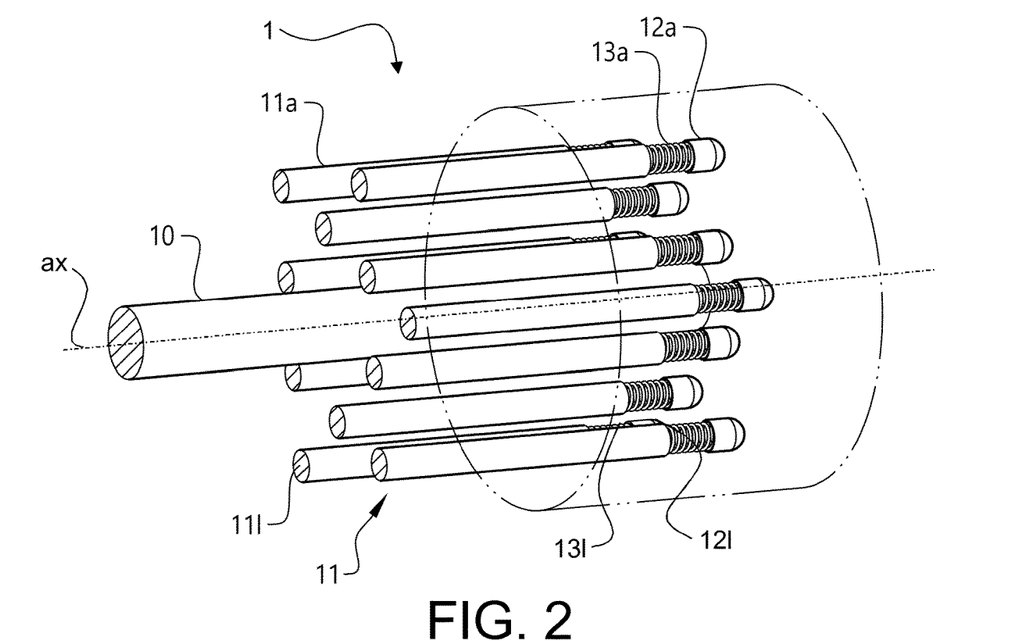
FIG. 2 is a perspective view of the stationary part of a power supply connector according to a first example of the invention.

FIG. 2 in a perspective view depicts the first part 1 of the power supply connector 3 of the exemplary wheel loader in FIG. 1. It has a shaft 10 connected to the rear structure 41. The shaft has a turn axis ax. A set of power cables, i.e. conductors 11 coming from the electric power sources (e.g. battery) in the rear structure 41 includes twelve inlet conductors 11*a-l*. The electrical motor/generator requires three phase voltage for the motor and generator drive respectively, whereby a set of twelve electrical power cables, i.e. conductors 11 is required for the application. Each inlet conductor 11*a-l* is at its end is provided with a sliding connection brush 12*a*, which may be of carbon or any other suitable material. A pressure spring 13*a* urges the respective sliding connection brush 12*a* to the right in the figure. The sliding connection brushes of the inlet cables 11a-l are arranged along two concentric circles with six sliding connection brushes in each.

Figure 3:
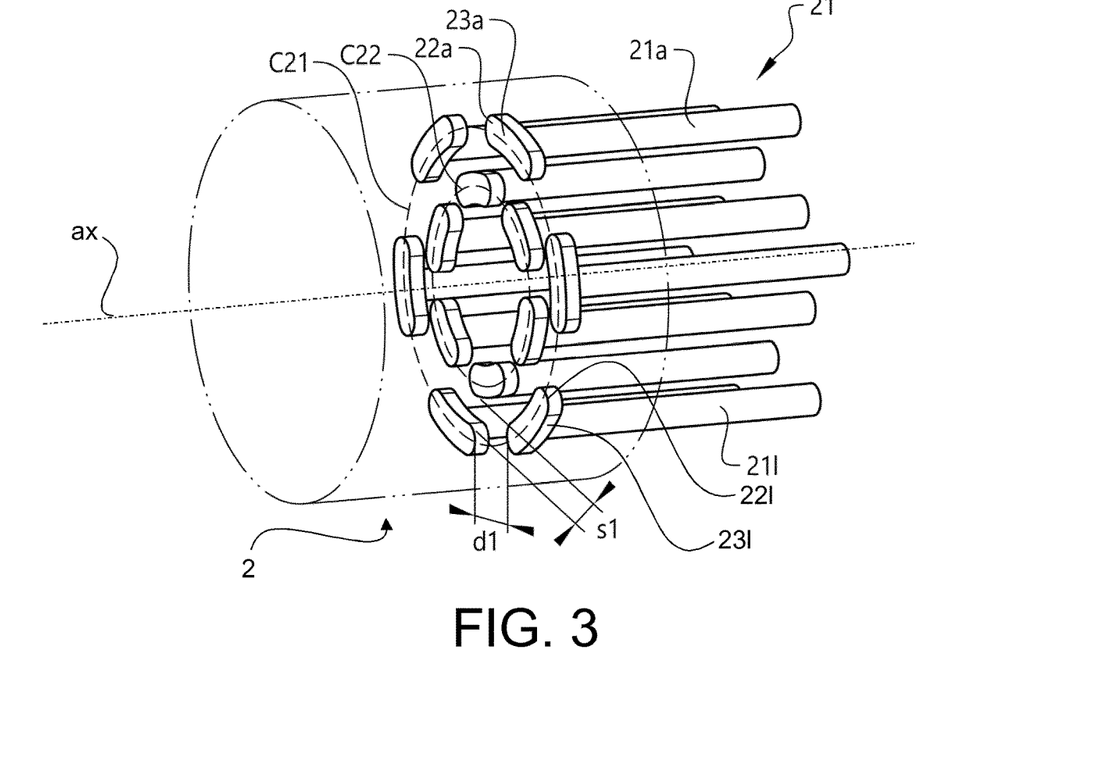
FIG. 3 is a perspective view of the rotatable part of the power supply connector according to the first example.

FIG. 3 correspondingly illustrates the second part 2 of the power supply connector 3. When assembled the second part 2 is arranged to turn about the axis ax of the shaft 10 of the first part 1. n outlet wiring 21 has twelve outlet conductors 21a-l leading to various electric power consumers in the rotatable structure. Each outlet conductor 21a-l is provided with a connection plate 22a having a contact surface 23a. The connection plates 22a are arranged along two concentric circles C21, C22 with six connection plates in each.

The connection plates 22a are all aligned with a respective sliding connection brush 12a of the first part 1. The sliding connection brushes 12a-l are held in contact with the respective contact surface 23a-l by a respective one of the pressure springs 13a-l. All contact surfaces 23a-l are located in a common plane. The pressure springs 13a-l are illustrated as coil springs, but can be any suitable springing means, e.g. a leaf spring, a rubber bushing, or any other resilient member.

The wheel-loader in FIG. 1 required a turnability of 30°. To arrange the contact surfaces 23a-l to allow a 30° turnability of the connector 3, a maximum angular distance between each in circumferential direction adjacent contact surface 23a-l must be maximum 30°.

Similar if the required turnability where 50°, the maximum angular distance between each in circumferential direction adjacent contact surface 23a-l is a maximum 10°.

A smaller allowed angular distance can be compensated with a larger diameter of the circle in order to achieve a sufficient distance between two adjacent contact surfaces 23a-l.

Figure 4:
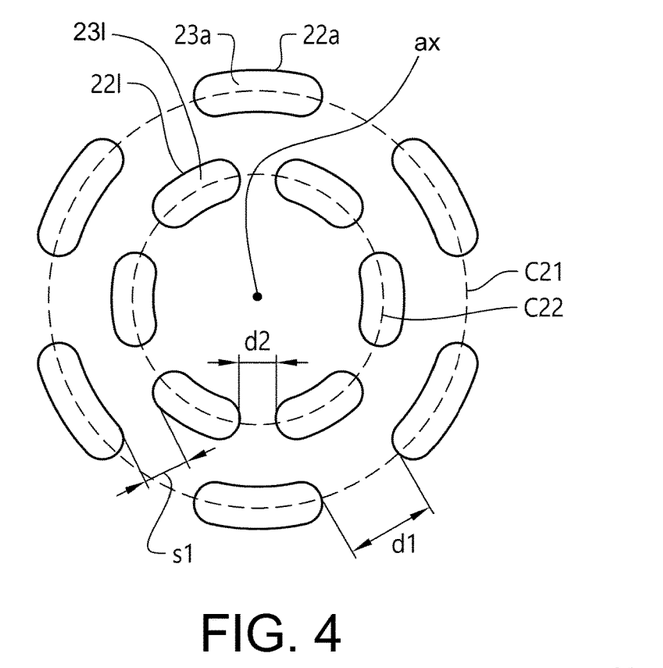
FIG. 4 is a schematic end view of the part shown in FIG. 3.

As better visible in FIG. 4, which is an end view from the left of FIG. 3, the connection plates 22a-l and its contact surface 23a-l are kidney-shaped and oblong in the circumferential direction. In FIG. 4 the two radial spaced circular shapes C21, C22 are shown from above. Each connection plate and its contact surface 23a-l in the outer circle C21 extends about 30°, and the angular distance between two in circumferential direction adjacent connection plates consequently is also about 30°. The connection plates along the inner circle C22 are angularly offset those along the outer circle C21 about 30°.

The distance d1 between the connection plates along the outer circle C21 is about the same as the angular extension of each of these connection plates. The distance d2 between the connection plates along the inner circle C22 is somewhat less than the angular extension of each of these connection plates. The distance s1 between a connection plate along the inner circle C22 and a connection plate along the outer circle C21 is larger than d2 but smaller than d1.

Figure 5:
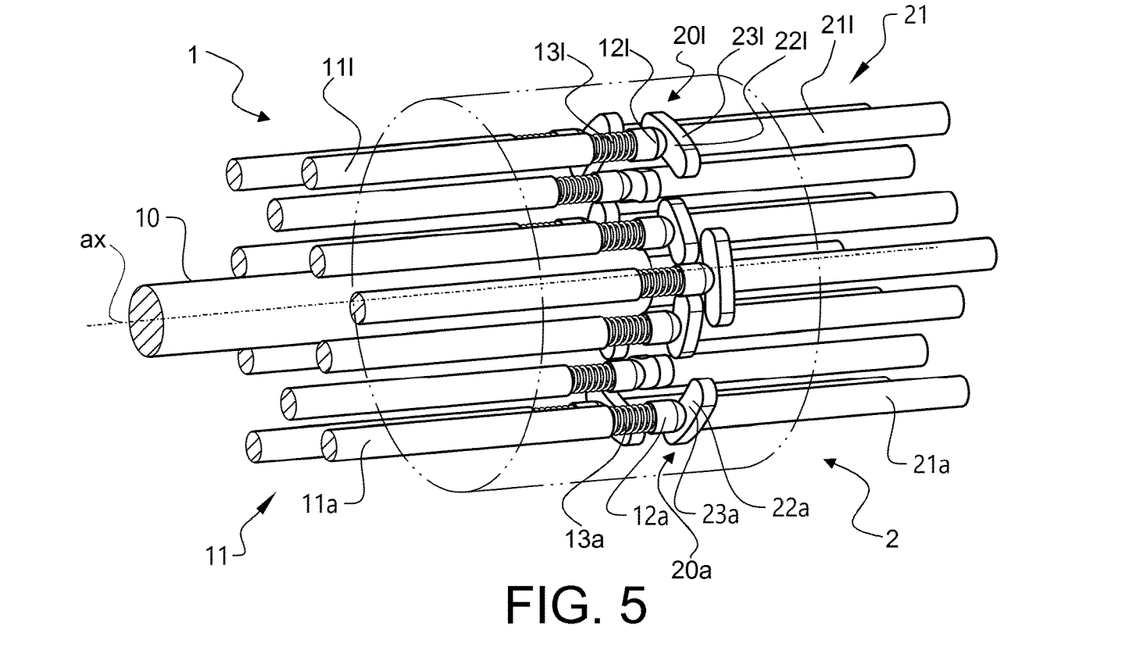
FIG. 5 is a perspective view of the assembled power supply connector according to the first example.

FIG. 5 shows a perspective view of the first and second parts 1, 2 when assembled together. The second part 2 in this example is turnable 30° about the axis of the shaft 10 of the first part 2. Each conductor of the set 11 of conductors 11a-l of the first part 1 is connected to a corresponding conductor 21a-l of the set 12 conductors 11a-l of the second part 2, through the electrical connections 20a-l. The sliding connection brush 12a-l of each of the conductor 11a-l of the first set 11 of conductors is by its respective pressure spring 13a-l kept in contact with the contact surface 23a-l of the connection plates 22a-l of the corresponding conductors 21a-l of the second part 2.

Figure 6:
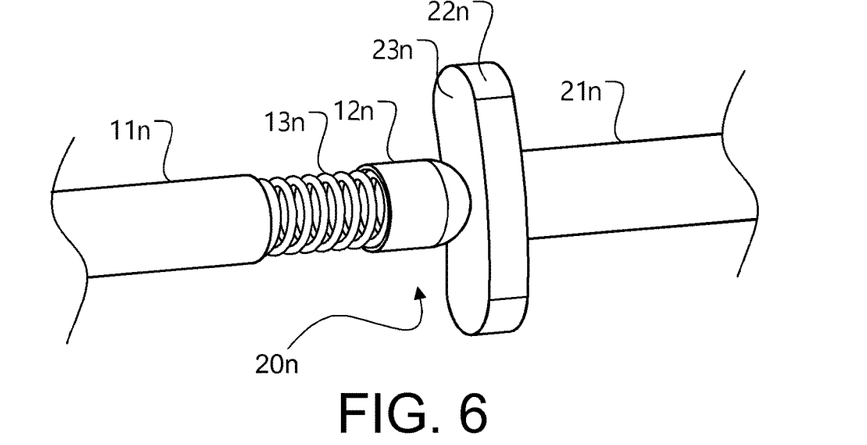
FIG. 6 is a perspective view of a detail of FIG. 5.

FIG. 6 illustrates more in detail the electrical connection 20n between an pair of corresponding electrical conductors 11n, 21n. More specifically the relations between a conductor 11n, a pressure spring 13n and a sliding connection brush 12n with the contact surface 23a of the connection plate 22a of the corresponding second conductor 21n. "n" is any of the electrical connections, conductors, pressure springs sliding connection brush, contact surface, connection plats a-l.

A second example of the power supply connector is illustrated in FIG. 7-10. The second illustrated example in FIG. 7-10 corresponds to the first illustrated example in FIGS. 2-5 and FIG. 6, with the differences that the circular shapes C11, C12 are provided with at different axial positions and with radial directed contact surfaces 103a-l. The general principal is the same as for the first embodiment with the required adaptions needed for the radial contact surfaces 103a-l. The differences of this second disclosed embodiment in comparison the first disclosed embodiment will be described shortly below.

Figure 7:
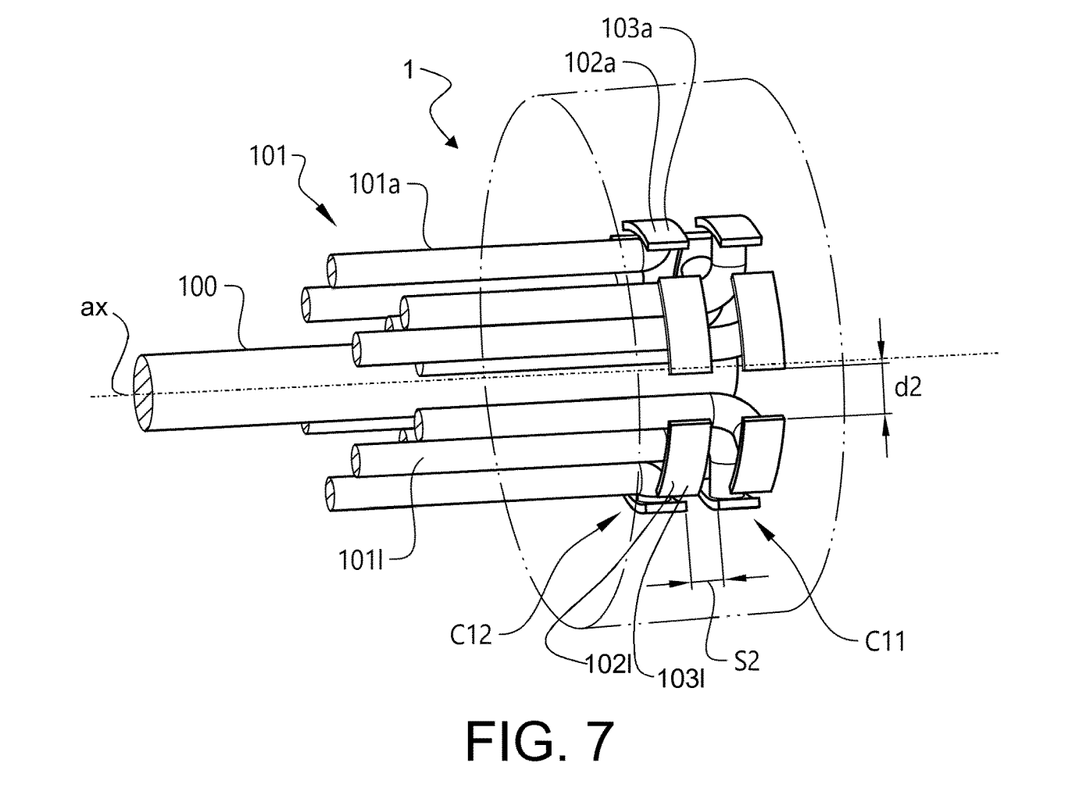
FIG. 7 is a perspective view of the stationary part a power supply connector according to a second example of the invention.

FIG. 7 is a schematic perspective view of the first part of the power supply connector 3. It has a shaft 100 with a rotational axis ax and a set of conductors 101 with twelve conductors 101a-l. Each conductor 101a-l is provided with a connection plate 102a-1, which in this example extends a short distance in the circumferential direction and has curved shape, i.e. is arc-shaped. The contact surfaces 103a-l is located on the side of the connection plates 102a-l that faces outwards. The connection plates 102a-l are arranged equally distributed along two circular shapes C11, C12, with six connection plates 102a-l with corresponding contact surfaces 103a-l along each circular shape. The circular shapes C11, C12 are axially spaced from each other and have the same diameter. Embodiments with axial spaced and with different diameter of the circular shapes are not illustrated but also not excluded.

The angular distance d2 between two adjacent contact surfaces 103a-l in the same circular shape C11, C12 is somewhat smaller than the angular extension of each contact surface 103a-l. The axial distance s2 between the contact surface 103a-l along the first circle C11 and the contact surface 103a-l along the second circle C12 is substantially of the same size as the in connection with the first illustrated embodiment previous discussed angular distance d2.

Each inlet conductor 101a-l is attached to and in electric contact with the inside of a respective connection plate 102a. Thus each inlet conductor 101a-l is bent 90° from the axial direction to the radial direction against the contact surface 103a-l.

Figure 8:
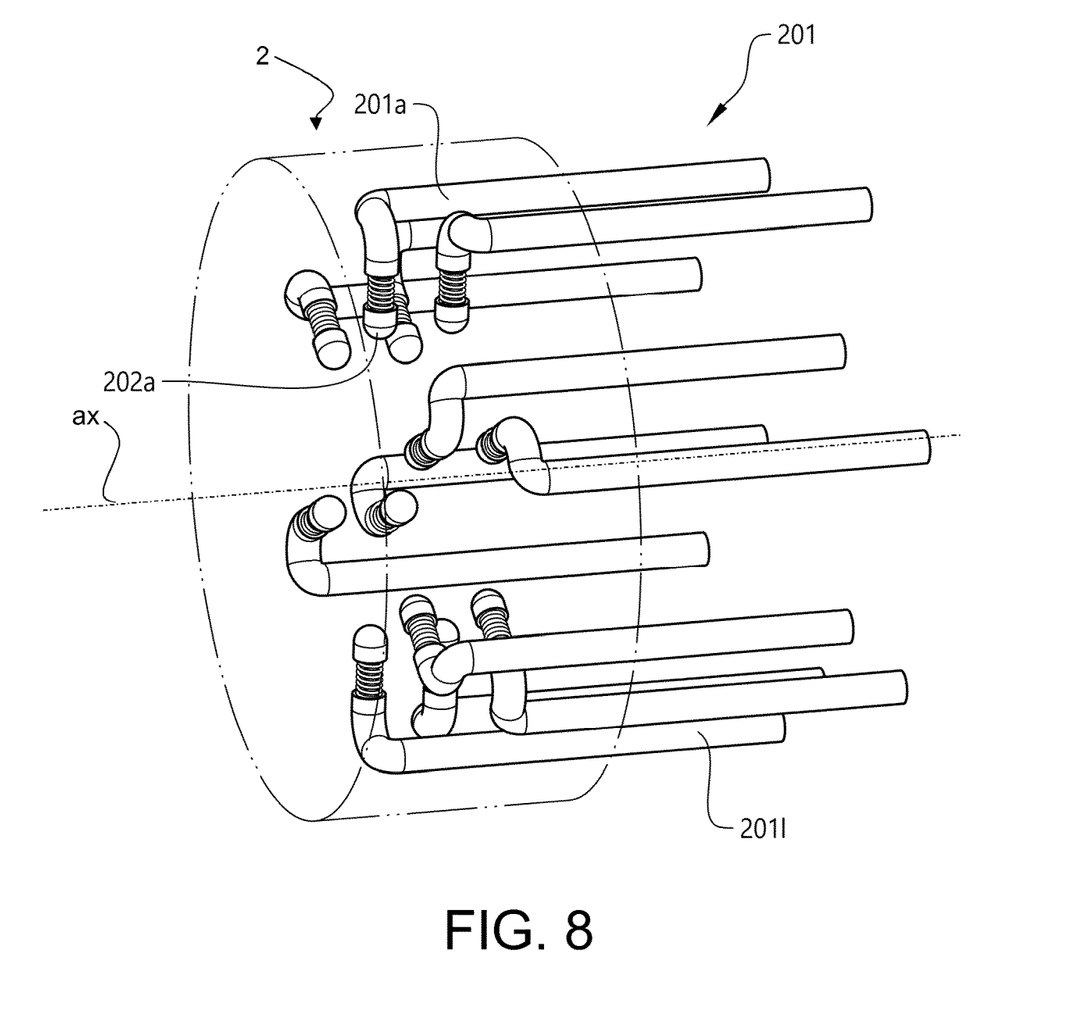
FIG. 8 is a perspective view of the rotatable part of the power supply connector according to the second example.

FIG. 8 schematically illustrates in a perspective view the corresponding second part 2, having a set 201 of twelve conductors 201a-l. The conductors 201a-l corresponds to the conductors 101a-l of the first part 1, and thus have their sliding connection brushes 202a-l arranged in corresponding circles. The sliding connection brushes 202a-l are urged radially inwardly against the contact surface 103a-l on the respective corresponding connection plate 102a-l.

Figure 9:
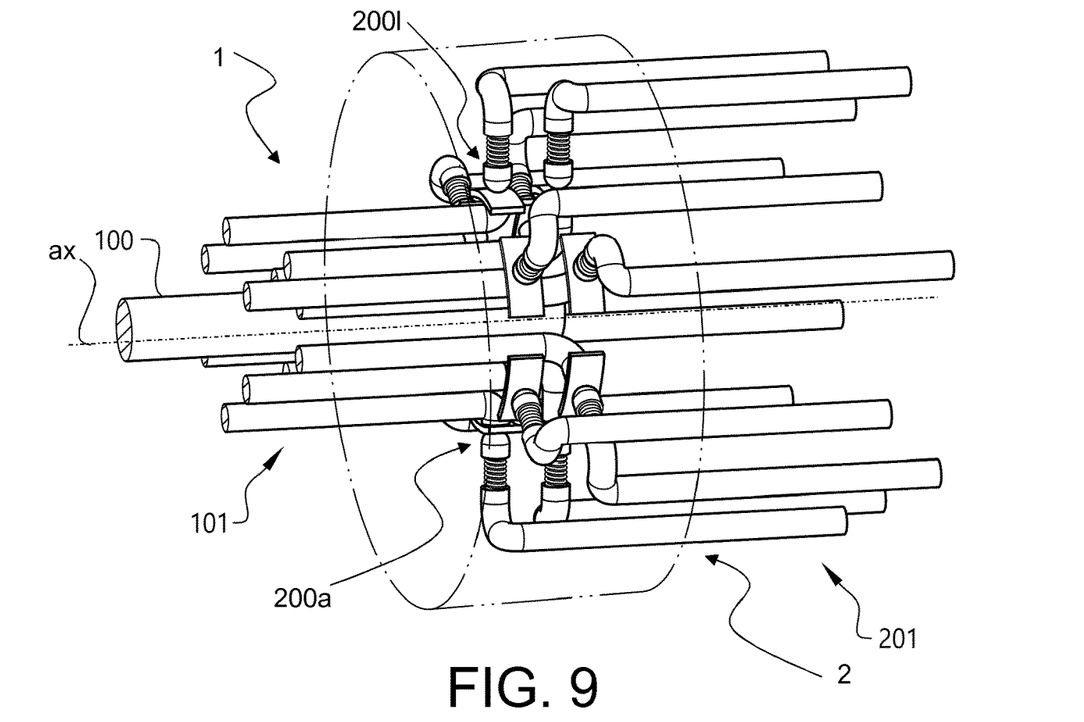
FIG. 9 is a perspective view of the assembled power supply connector according to the second example.

FIG. 9 illustrates the assembled power supply connector according to the second illustrated example with the second part 2 rotatable 30° around the axis ax of the shaft 100 at the first part 1.

Figure 10:
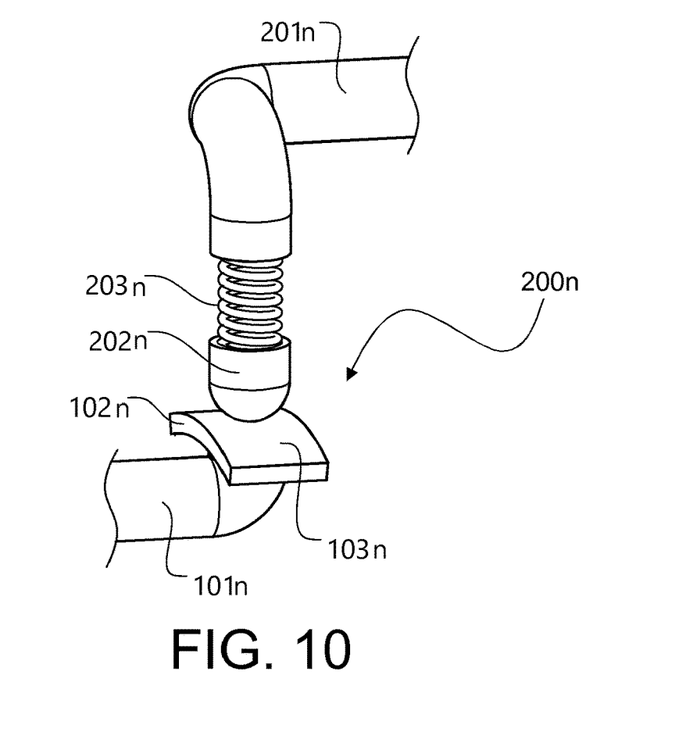
FIG. 10 is a perspective view of a detail of FIG. 9.

FIG. 10 illustrates more in detail the relation between a conductor 101n of the first part of the second illustrated embodiment and the corresponding conductor 201n. The conductor 101n is attached to the radially inner side of the connection plate 102n, which is provided with its contact surface 103n at its radially outer side. The sliding connection brush 202n slides in the circumferential direction on the contact surface 103n of the connection plate 102n. The conductor 201a of the second part 2 is bent 90° in a first direction, to obtain that the sliding connection brush 202n is pressed radially inwards. The conductor 201a of the second part 2 is also bent in the tangential direction also about 90° in order to find sufficient space for the connection brush 202n. This is due to the fact that all the contact surfaces 103n have the same diameter.

The invention claimed is:

1. A power supply connector having a first part and a second part that are connected to each other such that they can turn relative each other about a common turning axis within a predefined and/or restricted turning angle, the first part comprising a first set of plurality of conductors and the second part comprises a corresponding second set of plurality of conductors, such that pairs of conductors are formed, wherein the pairs of conductors are electrically connected by electrical connections comprising a connection tip on one of the first and the second part and a contact surface on the other one of the first and second part, wherein the electrical connections are provided in at least one circular shape around the turning axis of the power supply connector, wherein, for each pair of conductors:

a circumferential extension of the respective contact surface is less than 360° divided by a total number of pairs of conductors and multiplied by a total number of circular shapes of the at least one circular shape, an angular extension of the contact surface is at least equal to the predefined and/or restricted turning angle between the first part and the second part, and the contact surfaces are arranged around the at least one circular shape such that the pair of conductors are permanently electrically connected through the entire predefined and/or restricted turning angle.

2. A power supply connector according to claim 1, wherein a distance between each contact surface and any other contact surface is based on electrical insulation properties of an insulation material arranged there between.

3. A power supply connector according to claim 1, wherein each set of conductors is provided with
at least two conductors with a corresponding pair of electrical connections distributed over one circular shape.

4. A power supply connector according to claim 1, wherein the connection tip is a connection brush or a connection roller.

5. A power supply connector according to claim 1, wherein all connection tips are arranged on one and the same of the first and second part.

6. A power supply connector according to claim 1, wherein the contact surfaces are arranged along the at least one circular shape about the turning axis, with a circumferential distance between each contact surface and each adjacent contact surface arranged in the same at least one circular shape.

7. A power supply connector according to claim 6, wherein a first subset of the contact surfaces are arranged along a first circular shape around the turning axis and a second subset of the contact surfaces are arranged along a second circle shape around the turning axis, wherein the second circular shape has a diameter and/or an axial position different than the diameter and/or the axial position of the first circular shape.

8. A power supply connector according to claim 1, wherein the contact surface is coplanar with the at least one circular shape.

9. A power supply connector according to claim 1, wherein the contact surface of at least one connection plate is curved and faces outwardly in a radial direction of the at least one circular shape.

10. A machine having a first structure and a second structure, being turnable relative each other about a turn axis and being provided with a power supply connector according to claim 1, with the first structure fixed to the first part of the power supply connector and the second structure fixed to the second part of the power supply connector.

11. A vehicle having a first structure and a second structure, being turnable relative each other about a turn axis and being provided with a power supply connector according to claim 1 with the first structure fixed to the first part of the power supply connector and the second structure fixed to the second part of the power supply connector.

12. A method of using the power supply connector according to claim 1, the method comprising:

providing electric power from the first set of conductors, on a first structure of a machine or a vehicle to the second set of plurality of conductors on a second structure of the machine/vehicle.

13. The power supply connector according to claim 1, wherein each set of conductors is provided with at least three conductors with corresponding pairs of electrical connections distributed over one circular shape.

14. The power supply connector according to claim 1, wherein each set of conductors is provided with at least six conductors with corresponding pairs of electrical connections distributed over one circular shape.

15. The power supply connector according to claim 1, wherein each set of conductors is provided with at least six conductors with corresponding pairs of electrical connections distributed over two circular shapes.

16. The power supply connector according to claim 1, wherein each set of conductors is provided with at least twelve conductors with corresponding pairs of electrical connections distributed over two circular shapes.

17. A first part for a power supply connector adapted to be turnable connected to a second part, wherein the first part being turnable in a predefined and/or restricted turning angle relative the second part about a turn axis, wherein the first part has a set of conductors, each conductor being provided with a contact surface, wherein the contacts surfaces being provided in at least one circular shape around a turn axis of the power supply connector, wherein, for each conductor:

a circumferential extension of the contact surface is less than 360° divided by a total number of conductors and multiplied by a total number of circular shapes of the at least one circular shape, and an angular extension of the contact surface is at least equal to the predefined and/or restricted turning angle between the first part and the second part.

* * * * *